United States Patent
Park

(10) Patent No.: US 10,915,176 B2
(45) Date of Patent: Feb. 9, 2021

(54) APPARATUS FOR PROVIDING HAPTIC PATTERN ON SMART DEVICE

(71) Applicant: LYNTZ CO., LTD., Seoul (KR)

(72) Inventor: Dong Hyun Park, Seoul (KR)

(73) Assignee: LYNTZ CO., LTD., Seoul (KR)

( * ) Notice: Subject to any disclaimer, the term of this patent is extended or adjusted under 35 U.S.C. 154(b) by 0 days.

(21) Appl. No.: 16/488,188

(22) PCT Filed: Jan. 24, 2018

(86) PCT No.: PCT/KR2018/001056
§ 371 (c)(1),
(2) Date: Aug. 22, 2019

(87) PCT Pub. No.: WO2018/155825
PCT Pub. Date: Aug. 30, 2018

(65) Prior Publication Data
US 2020/0285316 A1 Sep. 10, 2020

(30) Foreign Application Priority Data
Feb. 23, 2017 (KR) .................. 10-2017-0024017

(51) Int. Cl.
*G06F 3/01* (2006.01)
*G06F 3/041* (2006.01)
(Continued)

(52) U.S. Cl.
CPC ............ *G06F 3/016* (2013.01); *G06F 3/0412* (2013.01); *G09B 21/003* (2013.01); *H04B 1/3888* (2013.01); *G06F 2200/1634* (2013.01)

(58) Field of Classification Search
CPC ...... G06F 3/016; G06F 3/0412; G09B 21/003
See application file for complete search history.

(56) References Cited

U.S. PATENT DOCUMENTS

2011/0109588 A1* 5/2011 Makinen .................. G08B 6/00
                                                                345/174
2015/0177838 A1* 6/2015 Bae ......................... G06F 1/169
                                                                345/173
2018/0028909 A1* 2/2018 Kim .................... H04M 1/0202

FOREIGN PATENT DOCUMENTS

KR   10-2011-0104266 A    9/2011
KR   10-2012-0139673 A   12/2012
(Continued)

OTHER PUBLICATIONS

International Search Report dated May 18, 2018, issued in corresponding International Application No. PCT/KR2018/001056, filed Jan. 24, 2018, 2 pages.

*Primary Examiner* — Laurence J Lee
(74) *Attorney, Agent, or Firm* — Christensen O'Connor Johnson Kindness PLLC

(57) ABSTRACT

A smart device is stored in a storage unit of a haptic pattern providing apparatus, and the haptic pattern providing apparatus provides a user with an electrical stimulus pattern matched with visual information displayed on the stored smart device through an electro-sensitive panel which is installed over the storage unit and closely attached to a touch screen of the smart device. The haptic pattern providing apparatus senses a touch position of the user on the touch screen, and provides the user with a haptic pattern matched with the visual information displayed on the corresponding touch position through the electro-sensitive panel, such that the user can receive various pieces of visual information displayed on the smart device as haptic information implemented as haptic patterns through a process in which the user scans the electro-sensitive panel closely attached to the touch screen of the smart device with his or her finger.

10 Claims, 4 Drawing Sheets

(51) Int. Cl.
  *G09B 21/00* (2006.01)
  *H04B 1/3888* (2015.01)

(56) References Cited

FOREIGN PATENT DOCUMENTS

| KR | 10-2014-0097704 A | 8/2014 |
| KR | 10-1554256 B1 | 9/2015 |
| KR | 10-1650099 B1 | 8/2016 |

* cited by examiner

APPARATUS FOR PROVIDING HAPTIC PATTERN ON SMART DEVICE

TECHNICAL FIELD

The present disclosure relates to a haptic pattern providing apparatus for a smart device, and more particularly, to a haptic pattern providing apparatus for a smart device, which converts visual information displayed on a smart device into haptic information and provides the haptic information for a blind person who uses the smart device. The smart device is stored in a storage unit of the haptic pattern providing apparatus, and the haptic pattern providing apparatus provides a user with an electrical stimulus pattern matched with visual information displayed on the stored smart device through an electro-sensitive panel which is installed over the storage unit and closely attached to a touch screen of the smart device. The haptic pattern providing apparatus senses a touch position of the user on the touch screen of the smart device, and provides the user with a haptic pattern matched with the visual information displayed on the corresponding touch position through the electro-sensitive panel, such that the user can receive various pieces of visual information displayed on the smart device as haptic information implemented as haptic patterns through a process in which the user scans the electro-sensitive panel closely attached to the touch screen of the smart device with his or her finger.

BACKGROUND ART

Recently, the spread of various electronic and portable electronic devices such as a computer, mobile communication terminal, PDA and PMP has increased. The use of such electronic devices causes another type of digital divide depending on whether users can access digital information. Since existing typical electronic devices are designed based on the non-disabled who have no physical difficulties, it is difficult for the disabled to access digital information.

Furthermore, the recent spread of smart phones has rapidly increased interest in smart devices. However, blind people who cannot see a screen displayed on a touch screen may feel significant inconvenience in using a smart device in that the smart device basically provides an input and output at the same time through the touch screen. In order for the blind people to acquire contents displayed on the smart device, the blind people had to receive information displayed on the smart device as voice or receive only text information displayed on the smart device using a screen reader such as a text-to-speech program through hearing, as disclosed in Korean Patent No. 747,724.

Therefore, the blind people cannot receive visual image information such as a symbol, graph and figure, which are difficult to express with voice, among various pieces of information displayed on the smart device, and can limitedly receive only text information and thus have difficulties in acquiring information.

In order to solve such a problem, Korean Patent No. 1,221,513 has disclosed a graphic haptic electronic board which receives visual information from a computer or embedded system through a UART (Universal Asynchronous Receiver/Transmitter), raises pins of a plurality of ultrasonic motors configured in multiple arrays according to a control command, and thus transfers visual information as haptic information to a blind person.

However, when the above-described method of raising the pins of the plurality of ultrasonic motors is used, the plurality of ultrasonic motors configured in multiple arrays are difficult to integrate in a small size, which makes it difficult to reduce the size and weight of the device. Furthermore, since the graphic haptic electronic board requires a high voltage to obtain a sufficient generation force, the graphic haptic electronic board has high electricity consumption, which makes it inconvenient to carry the graphic haptic electronic board.

Furthermore, since a user needs to carry the graphic haptic electronic board separately from a portable smart device in order to use the graphic haptic electronic board with the portable smart device, it is inconvenient for the user to carry the graphic haptic electronic board separately at all times.

DISCLOSURE

Technical Problem

Various embodiments are directed to a haptic pattern providing apparatus for a smart device, which converts visual information displayed on a smart device into haptic information and provides the haptic information for a blind person who uses the smart device. The smart device is stored in a storage unit of the haptic pattern providing apparatus, and the haptic pattern providing apparatus provides a user with an electrical stimulus pattern matched with visual information displayed on the stored smart device through an electro-sensitive panel which is installed over the storage unit and closely attached to a touch screen of the smart device. The haptic pattern providing apparatus senses a touch position of the user on the touch screen of the smart device, and provides the user with a haptic pattern matched with the visual information displayed on the corresponding touch position through the electro-sensitive panel, such that the user can receive various pieces of visual information displayed on the smart device as haptic information implemented as haptic patterns through a process in which the user scans the electro-sensitive panel closely attached to the touch screen of the smart device with his or her finger.

Technical Solution

In an embodiment, there is provided a haptic pattern providing apparatus for a smart device, which converts visual information displayed on a smart device into haptic information while interworking with the smart device and provides the haptic information. The haptic pattern providing apparatus may include: a main body having a storage unit in which the smart device is stored; an electro-sensitive panel attached to a touch screen of the smart device stored in the storage unit, and configured to provide a haptic pattern to a user; and a cover formed in a frame shape, and coupled to the main body over the storage unit so as to fix and support the smart device stored in the storage unit, wherein while the user scans the electro-sensitive panel attached to the touch screen through a body part of the user, the haptic pattern providing apparatus receives haptic pattern information matched with the visual information displayed on a touch position of the user, sensed through the touch screen of the smart device, from the smart device, generates an electrical signal according to the received haptic pattern information, and provides the electrical signal as haptic information through the electro-sensitive panel.

Advantageous Effects

The haptic pattern providing apparatus for a smart device in accordance with the embodiment of the present invention can enable a user to receive various pieces of visual information displayed on a smart device as haptic patterns through a process of scanning a touch screen of the smart device with his or her finger. In particular, even when using a general smart device having no separate haptic function mounted therein, the user may mount the haptic pattern providing apparatus on the general smart device, and thus easily receive various pieces of visual information displayed on the smart device as haptic patterns.

MODE FOR INVENTION

The present invention may be modified in various manners and have various embodiments. Thus, specific embodiments will be illustrated in the accompanying drawings, and described in detail with the reference to the drawings.

However, the present invention is not limited to the specific embodiments, and it should be understood that the present invention may include all modifications, equivalents and substitutions without departing from the sprit and scope of the present invention. The terms such as first and second may be used for describing various components, but the components should not be limited by the terms. The terms are used only for distinguishing from one component from another component. For example, a first component may be referred to as a second component, and the second component may be referred to as the first component, without departing from the scope of the present invention.

The terms used in this specification are used only to describe a specific embodiment, and are not intended to limit the present invention. The terms of a singular form may include plural forms unless referred to the contrary. In this specification, the meaning of "include" or "have" specifies a property, a number, a step, a process, an element, a component, or combinations thereof, but does not exclude one or more other properties, numbers, steps, processes, elements, components, or combinations thereof.

Hereafter, specific embodiments will be described in detail with reference to the accompanying drawings.

Figure 1:
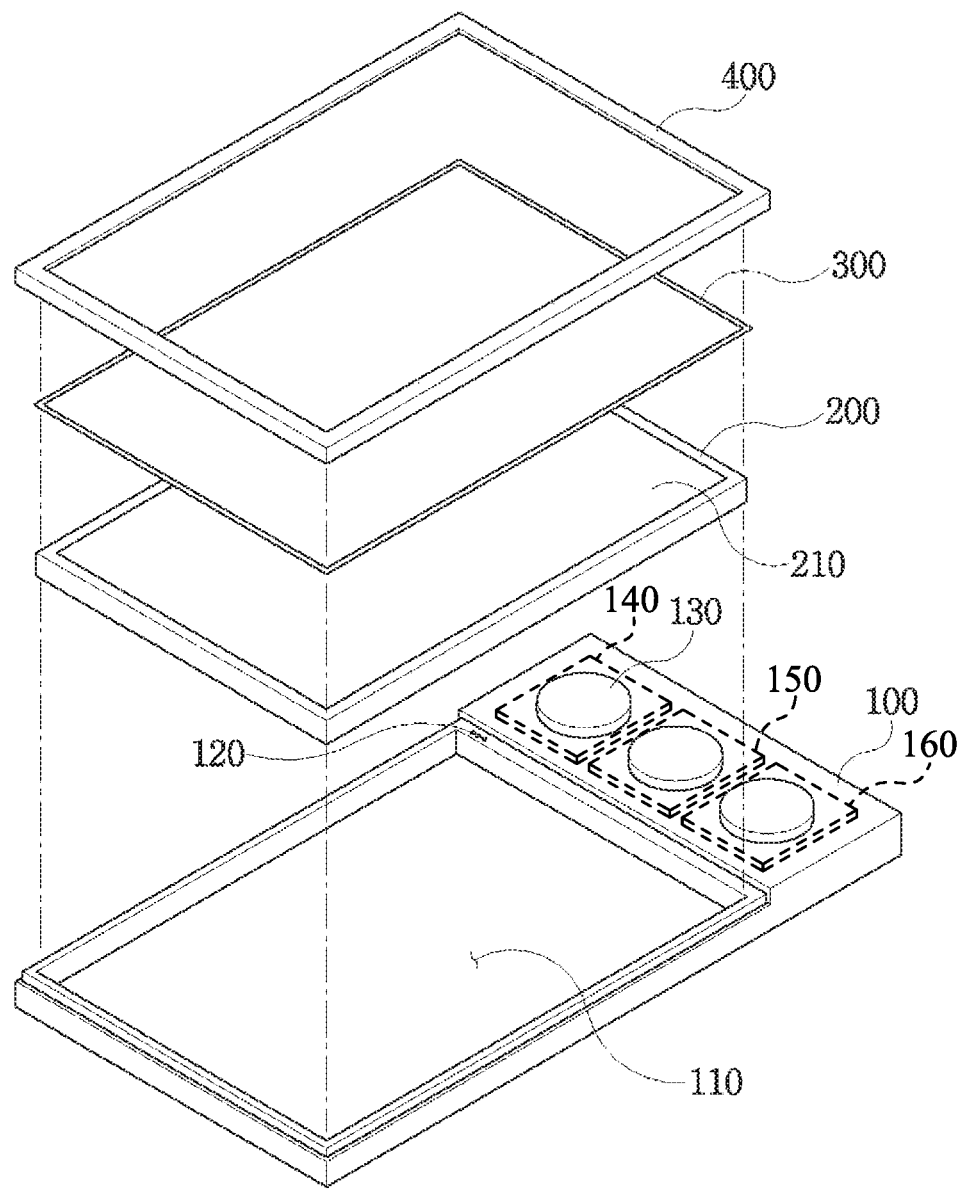
FIG. 1 is a diagram illustrating a configuration of a haptic pattern providing apparatus for a smart device in accordance with an embodiment of the present invention.
Figure 2:
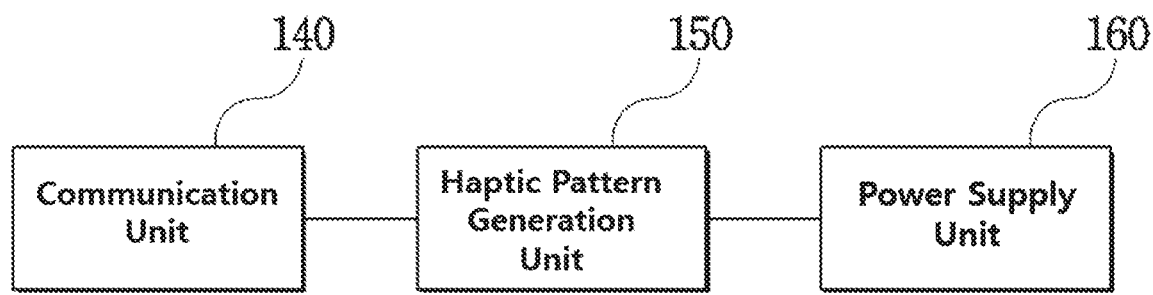
FIG. 2 is a block diagram illustrating an internal configuration of a main body illustrated in FIG. 1.
Figure 3:
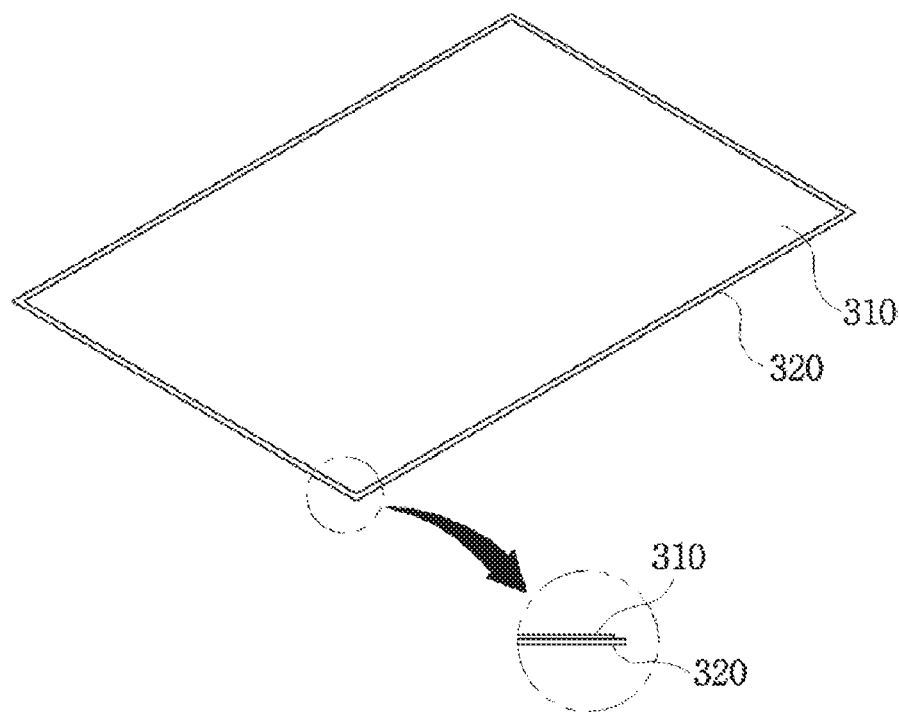
FIG. 3 is a diagram illustrating a configuration of an electro-sensitive panel illustrated in FIG. 1.

FIG. 1 is a diagram illustrating an external configuration of a haptic pattern providing apparatus for a smart device in accordance with an embodiment of the present invention, FIG. 2 is a diagram illustrating an internal configuration of a main body illustrated in FIG. 1, and FIG. 3 is a diagram illustrating a configuration of an electro-sensitive panel illustrated in FIG. 1.

As illustrated in FIG. 1, the haptic pattern providing apparatus for a smart device in accordance with the embodiment of the present invention includes a main body 100, an electro-sensitive panel 300 and a cover 400. The main body 100 has a smart device 200 disposed therein and generates an electric stimulus pattern. The electro-sensitive panel 300 is attached to a touch screen 210 of the smart device 200 and provides an electric stimulus pattern to a user. The cover 400 is coupled to the main body 100 to support and fix the smart device 200 stored in the main body 100, and transfers the electric stimulus pattern generated by the main body 100 to the electro-sensitive panel 300.

When the touch screen of the smart device is touched by the user's finger, the haptic pattern providing apparatus may sense the touch position and transfer a haptic pattern matched with visual information displayed on the touch position to the user's finger through the electro-sensitive panel. Thus, along the trace of the user's finger which is moved while the user scans the electro-sensitive panel attached to the touch screen of the smart device, the haptic pattern providing apparatus may provide haptic patterns matched with visual information displayed on the corresponding positions. Through this process, the user can tactually recognize the image information displayed on the touch screen through combinations of the provided various haptic patterns.

Even when using a general smart device having no haptic function incorporated therein, the user may mount the haptic pattern providing apparatus for a smart device in accordance with the embodiment of the present invention on the general smart device, and thus easily receive various pieces of visual information displayed on the smart device as haptic patterns.

More specifically, the main body 100 of the haptic pattern providing apparatus for a smart device includes a storage compartment 110 of which the top is opened to store the smart device 200. The storage compartment 110 may be formed in various sizes and shapes depending on the shape of a smart device as an application target, and have various user interface buttons, a charging terminal and the like which are exposed to the outside.

As illustrated in FIGS. 1 and 2, the main body 100 includes a communication unit 140, a haptic pattern generation unit 150 and a power supply unit 160. The communication unit 140 performs wired/wireless communication with the smart device, the haptic pattern generation unit 150 generates an electric stimulus pattern matched with visual information displayed on a touch screen coordinate touched by the user, and the power supply unit 160 provides power. The main body 100 has a connector terminal 120 installed on one side of the outside thereof and configured to transfer an electric stimulus pattern signal generated by the haptic pattern generation unit 150 to the cover 400.

The communication unit 140 in accordance with the embodiment of the present invention serves to transmit/receive data to/from the smart device through wired or wireless communication. For this operation, the main body may have a communication terminal (not illustrated) for wireless communication with the smart device, which is installed at one side thereof. In addition, the communication unit 140 may include a short-range wireless communication module such as a Bluetooth module or NFC module for wireless communication.

The power supply unit 160 includes a battery for supplying power required for driving the haptic pattern providing apparatus, and the main body has a power port (not illustrated) installed on one side thereof and configured to supply power to the battery installed in the power supply unit 160. Therefore, the power supply unit 160 may be used while receiving power through a wire or used as a rechargeable power supply. Furthermore, when the haptic pattern providing apparatus in accordance with the embodiment of the present invention is connected to the smart device, the haptic pattern providing apparatus may be driven by power supplied from the smart device, or the battery installed in the main body may be charged by the power supplied from the smart device.

The haptic pattern generation unit 150 in accordance with the embodiment of the present invention generates a haptic pattern through an electrical signal. The haptic pattern generation technology applied to the present invention, which has been recently developed and used, generates an electrical signal according to the position of a portion touched by a user through the electro-sensitive panel 300 attached to the touch screen, and provides a predetermined electrical stimulus pattern to the contacted body part of the user, as disclosed in Korean Patent Application Laid-Open No. 2010-0076968 filed by SENSEG, which is incorporated herein by reference.

At this time, the generated electrical stimulus pattern can be modified in various manners by modifying parameters such as the voltage, current, wavelength, frequency and waveform of the electrical signal. The haptic texture felt by the finger may be divided into a rough texture, a smooth texture and the like to implement various haptic patterns, depending on a generated electrostatic waveform. Thus, when the user scans the touch screen with his or her finger, the haptic pattern providing apparatus may provide haptic patterns matched with visual information displayed on the corresponding positions along the trace of the user's finger which is moved while the user scans the touch screen of the smart device through the electro-sensitive panel 300 attached to the top surface of the touch screen. Through this process, the user can tactually recognize the image information displayed on the touch screen through combinations of the provided various haptic patterns.

The main body may additionally include a user interface in the form of a button unit 130 installed on the front surface thereof and configured to control the smart device through a dedicated application installed in the smart device in advance. The manipulation button unit 130 has a physical button structure in which the user can recognize and press buttons constituting the manipulation button unit 130 through a haptic feel by his or her finger. The manipulation button unit 130 provides a function of stopping a screen displayed on the touch screen or starting the stopped screen, the function of returning and skipping a screen and the like.

The cover 400 may be formed in a frame shape and coupled to the main body 100, and the cover 400 and the main body 100 may be coupled through various fastening methods. For example, since the cover 400 has an insertion protrusion formed at the bottom thereof and the main body 100 has an insertion groove formed at the top thereof, the cover 400 may be inserted and coupled to the main body 100.

The cover 400 has a connection terminal (not illustrated) installed at a position corresponding to the connector terminal 120 installed on the one side of the outside of the main body and configured to receive the electrical stimulus pattern signal generated by the haptic pattern generation unit 150 of the main body. Furthermore, the cover 400 has a connection electrode (not illustrated) electrically connected to the connection terminal in order to transfer the electrical stimulus pattern signal received through the connection terminal to the electro-sensitive panel 300.

Therefore, when the cover 400 is mounted on the main body 100, the cover 400 may be coupled to the main body 100 to support and fix in place the smart device 200 stored in the main body 100, and the connection terminal installed on the cover may be connected to the connector terminal 120 installed on the one side of the outside of the main body, receive the electrical stimulus pattern signal generated by the haptic pattern generation unit of the main body, and transfer the received electrical stimulus pattern signal to the electro-sensitive panel through the connection electrode.

The electro-sensitive panel 300 is composed of conductive electrodes having an insulator formed thereon, and attached to the touch screen 210 of the smart device 200. When the touch screen senses a contact of the user's finger with the surface of the touch screen having the electro-sensitive panel attached thereto, the electro-sensitive panel 300 serves to transfer an electrical stimulus corresponding to the portion touched by the user's finger to the user's finger according to the position of the portion touched by the user's finger.

As illustrated in FIG. 3, the electro-sensitive panel 300 in accordance with the embodiment of the present invention includes two laminated films having different properties, for example, an electrification layer 320 and an insulating layer 310. The insulating layer 310 is positioned over the electrification layer 320. Since the size of the electrification layer 320 is larger by a predetermined length or more than the size of the insulating layer 310 at the top, bottom, left and right thereof, the area of the electrification layer 320 is larger by a predetermined area than the area of the insulating layer 310. Therefore, the electrification layer 320 is exposed to the top at the four corners of the electron-sensitive panel, and the exposed electrification layer 320 is contacted with the connection electrode installed at the bottom of the cover 400. Thus, the electrical stimulus pattern signal received by the cover 400 through the connection terminal may be transferred to the electrification layer 320 through the connection electrode, such that the electro-sensitive panel 300 can generate a haptic pattern. The exposed edge of the electrification layer is completely covered by the frame of the cover, and thus not exposed to the user.

The smart device 200 to which the present invention can be applied may include all types of electronic communication devices which have the touch screen 210 and can perform wired/wireless communication. For example, the smart device 200 may include a smart phone, a tablet PC, a PDA, a navigation system and the like. That is, when a contact of a body part of the user, such as a finger, occurs on the touch screen 210 of the smart device 200, the smart device 200 senses the contact and transfers haptic pattern information matched with visual information displayed on the touch position to the main body 100, and the main body 100 generates an electrical stimulus pattern according to the received haptic pattern information and transfers a haptic pattern to the user's finger through the electro-sensitive panel 300. Thus, when the user scans the touch screen 210 having the electro-sensitive panel of the smart device 200 attached thereto with his or her finger, the haptic pattern providing apparatus may provide haptic patterns matched with visual information displayed on the corresponding positions along the trace of the user's finger during the scanning process. Therefore, the user can tactually recognize the image information displayed on the touch screen through combinations of the provided various haptic patterns.

For this process, the smart device applied to the present invention needs to have a dedicated application for converting visual information displayed on the screen into haptic pattern information. The dedicated application for converting visual information displayed on the screen into haptic pattern information may be downloaded from an internet application site or the like and installed in the smart device by the user. Alternatively, when the smart device is mounted on the haptic pattern providing apparatus, a dedicated application embedded in the haptic pattern providing apparatus may be automatically downloaded and installed in the smart device. For this process, the main body in accordance with the embodiment of the present invention may include a memory in which the dedicated application is stored in advance.

Hereafter, the operation principle of the haptic pattern providing apparatus for a smart device in accordance with the embodiment of the present invention will be described.

Figure 4:
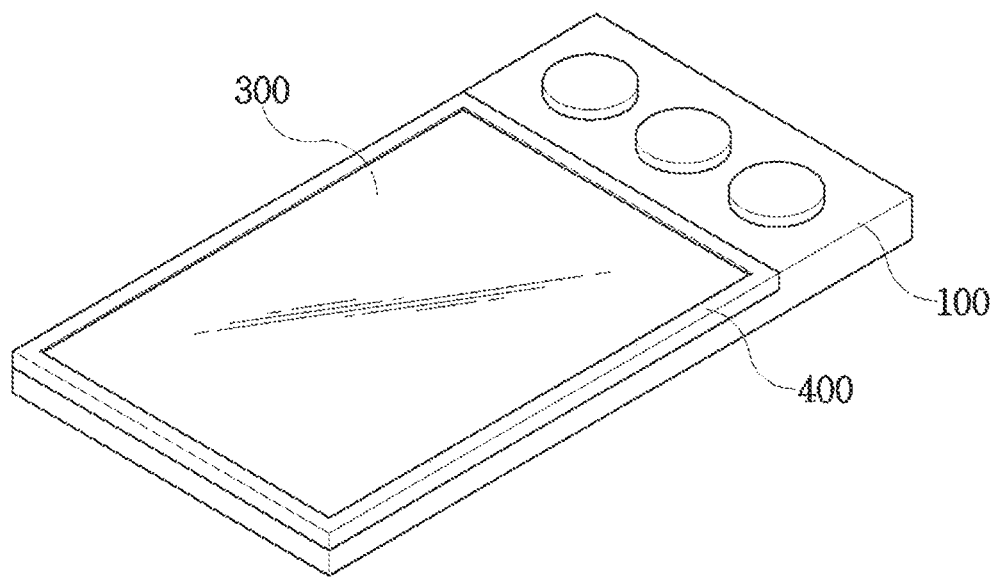
FIG. 4 is a diagram illustrating that components illustrated in FIG. 1 are coupled and mounted.

FIG. 4 is a diagram illustrating that the components illustrated in FIG. 1 are coupled and mounted.

As illustrated in FIG. 4, the smart device having the electro-sensitive panel 300 attached to the touch screen is stored in the main body 100, and the cover 400 is mounted on the top of the main body 100 such that the smart device and the haptic pattern providing apparatus are configured as one body.

First, when the touch screen of the smart device having the electro-sensitive panel 300 attached thereto is contacted by the user's finger, the smart device transfers haptic pattern information matched with visual information displayed on the position contacted by the user's finger to the main body 100 through wired/wireless communication.

The main body 100 generates an electrical stimulus pattern signal by modifying parameters such as the voltage, current, wavelength, frequency and waveform of an electrical signal according to the haptic pattern information received from the smart device, and outputs the electrical stimulus pattern signal to the connector terminal. The electrical stimulus pattern signal outputted to the connector terminal is transferred to the cover through the connection terminal installed on the cover 400, and the cover 400 transfers the electrical stimulus pattern signal to the electrification layer exposed along the edge of the electro-sensitive panel through the connection electrode. Thus, a haptic pattern is generated by the electro-sensitive panel, and provided to the body part of the user, which was contacted with the touch screen.

That is, as the smart device having the electro-sensitive panel 300 attached thereto is stored in the main body 100 and the cover 400 is mounted on the top of the main body, the connector terminal installed on one side of the outside of the main body and the connection terminal installed on the cover are connected so that the cover receives the electrical stimulus pattern signal from the main body. Furthermore, as the connection electrode which is electrically connected to the connection terminal is contacted with the electrification layer exposed along the edge of the electro-sensitive panel, the electrical stimulus pattern signal received from the main body by the cover is transferred to the electrification layer of the electro-sensitive panel.

Figure 5:
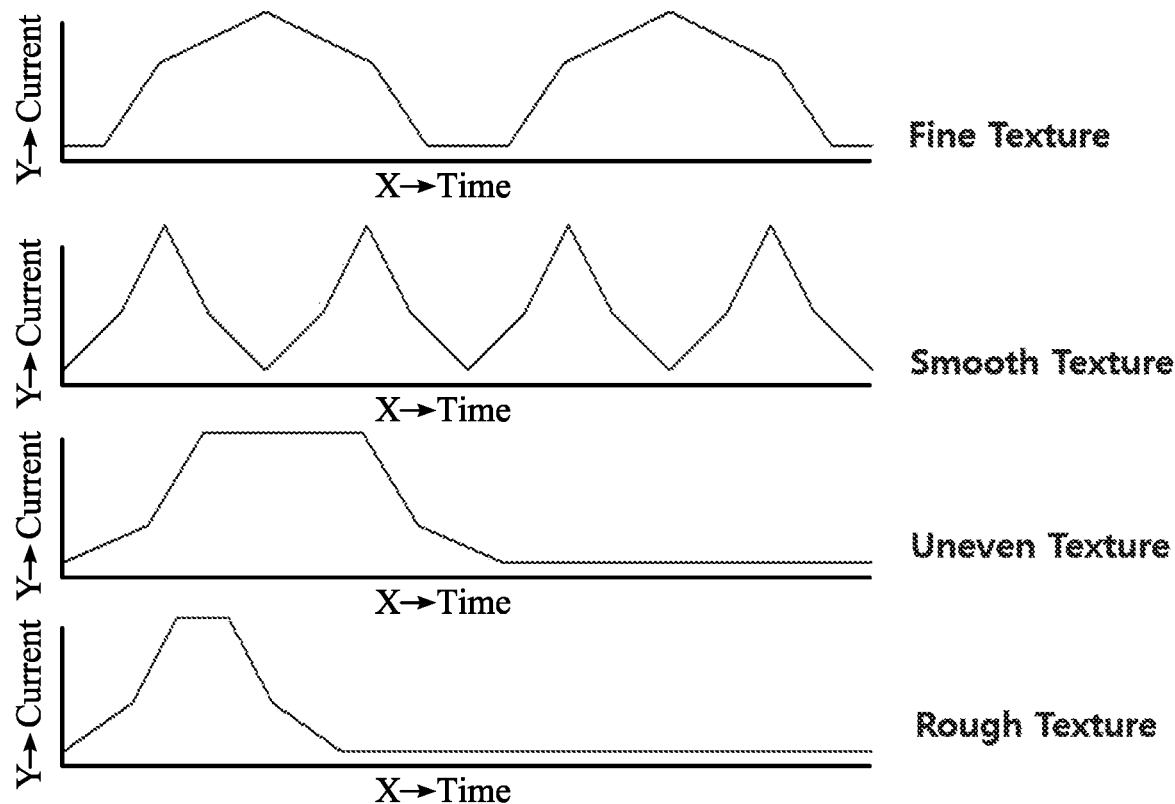
FIG. 5 is a diagram illustrating embodiments of haptic textures provided by the electro-sensitive panel in accordance with the embodiment of the present invention.

Thus, when the touch screen of the smart device having the electro-sensitive panel attached thereto is contacted by the user's finger, the main body may generate an electrical signal to generate a haptic pattern matched with visual information displayed on the position contacted by the user's finger. The generated electrical signal may provide an electrical stimulus to the user's finger through the electro-sensitive panel. At this time, the voltage, current, wavelength, frequency and waveform of the electrical signal may be modified to provide different haptic textures such as a fine texture, smooth texture, uneven texture and rough texture as illustrated in FIG. 5.

As such, the haptic pattern providing apparatus senses a touch position of the user on the touch screen of the smart device having the electro-sensitive panel attached thereto and provides various haptic patterns depending on the touch position. Therefore, when the user scans the touch screen with his or her finger, haptic patterns corresponding to scan positions of the user may be generated through the electro-sensitive panel attached to the top surface of the touch screen, such that the user can feel different haptic textures through the haptic feel and recognize an image displayed on the touch screen through combinations of various haptic textures. Through this process, the user can receive various piece of visual information displayed on the smart device as haptic patterns. For example, when a map image is displayed, different haptic patterns may be provided for a building, a street and a block area, respectively, and the user can recognize a difference between haptic patterns depending on positions of the map image through a screen scanning operation with his or her finger, and thus recognize the map image information displayed on the smart device.

The haptic pattern providing apparatus for a smart device in accordance with the embodiment of the present invention may convert various pieces of visual information such as a character, symbol, figure and image, displayed on the smart device, into haptic patterns and provide the haptic patterns. However, among various pieces of visual information displayed on the smart device according to the setting and use of the user, character and symbol information may be provided as voice, and only the figure and image information may be converted into haptic patterns and provided.

The present invention is not limited by the above-described embodiments and the accompanying drawings, but it is obvious to those skilled in the art such that various substitutions, modifications and changes can be made without departing from the spirit and scope of the present invention.

INDUSTRIAL APPLICABILITY

In accordance with the embodiment of the present invention, a user can transform various pieces of visual information displayed on the smart device as haptic patterns while scanning the touch screen of the smart device with his or her finger. In particular, even when using a general smart device having no specific haptic function incorporated therein, the user may mount the haptic pattern providing apparatus of the present invention and thus easily receive various pieces of visual information displayed on the smart device as haptic patterns.

The invention claimed is:

1. A haptic pattern providing apparatus from a smart device, which converts visual information displayed on a smart device into haptic information while interacting with the smart device and provides the haptic information, the haptic pattern providing apparatus comprising:
   a main body having a storage unit in which the smart device is stored;
   an electro-sensitive panel attached to a touch screen of the smart device stored in the storage unit, and configured to provide a haptic pattern to a user;
   a cover formed in a frame shape, and coupled to the main body over the storage unit so as to fix and support the smart device stored in the storage unit,
   wherein while the user scans the electro-sensitive panel attached to the touch screen through a body part of the user, the haptic pattern providing apparatus receives haptic pattern information matched with the visual information displayed on a touch position of the user, sensed through the touch screen of the smart device, from the smart device, generates an electrical signal according to the received haptic pattern information, and provides the electrical signal as haptic information through the electro-sensitive panel;

wherein the main body comprises a communication unit configured to perform wired or wireless communication with the smart device; and a haptic pattern generation unit configured to generate the electric signal according to the haptic pattern information to receive the haptic pattern information from the smart device through the communication unit and to generate the electrical signal according to the received haptic pattern information through the haptic pattern generation unit; and wherein the main body has a connector terminal configured to transfer the electrical signal generated by the haptic pattern generation unit, the cover has a connection terminal installed at a position corresponding to the connector terminal on the main body, and the electrical signal generated by the haptic pattern generation unit is transferred to the connection terminal through the connector terminal.

2. The haptic pattern providing apparatus of claim 1, wherein the electro-sensitive panel comprises an electrification layer and an insulating layer which have different properties and are laminated with the insulating layer positioned over the electrification layer and the electrification layer is exposed to the top at the four corners of the electro-sensitive panel.

3. The haptic pattern providing apparatus of claim 2, wherein a connection electrode electrically connected to the connection terminal is installed at the bottom of the cover so as to be contacted with the exposed electrification layer.

4. The haptic pattern providing apparatus of claim 3, wherein the electrical signal generated from the haptic pattern generation unit is transferred to the electrification layer of the electro-sensitive panel through the connection electrode.

5. The haptic pattern providing apparatus of claim 1, wherein the main body has a charging battery disposed therein.

6. The haptic pattern providing apparatus of claim 1, wherein the main body further comprises a memory configured to store a dedicated application for converting visual information displayed on the touch screen into haptic pattern information matched with the visual information.

7. The haptic pattern providing apparatus of claim 1, wherein the haptic pattern generation unit implements a haptic pattern by modifying a voltage, current, wavelength, frequency or waveform of the electrical signal.

8. The haptic pattern providing apparatus of claim 1, wherein the main body has a user interface on a front surface thereof and configured to control a display function on the smart device.

9. The haptic pattern providing apparatus of claim 8, wherein the user interface comprises a stop function for stopping a screen displayed on the touch screen of the smart device, a start function for starting the stopped screen, and a screen return and skip function.

10. The haptic pattern providing apparatus of claim 8, wherein the user interface is manipulable.

* * * * *